United States Patent
Otoguro (10) Patent No.: US 8,755,094 B2
(45) Date of Patent: Jun. 17, 2014

(54) METHOD OF MEASURING IRRADIATION POSITION SHIFT AND FOCUS SHIFT IN OPTICAL SCANNING APPARATUS

(75) Inventor: Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 13/454,289

(22) Filed: Apr. 24, 2012

(65) Prior Publication Data
US 2012/0287483 A1    Nov. 15, 2012

(30) Foreign Application Priority Data
May 9, 2011    (JP) .................. 2011-104737

(51) Int. Cl.
| | |
|---|---|
| *H04N 1/04* | (2006.01) |
| *H04N 1/23* | (2006.01) |
| *G06K 15/10* | (2006.01) |
| *H04N 1/60* | (2006.01) |
| *G03F 3/08* | (2006.01) |
| *G02B 13/16* | (2006.01) |
| *G01B 9/00* | (2006.01) |
| *B41J 27/00* | (2006.01) |
| *G01D 5/36* | (2006.01) |

(52) U.S. Cl.
USPC ............ 358/475; 358/296; 358/474; 358/1.5; 358/1.9; 358/518; 348/335; 356/124; 347/258; 250/237 G (58) Field of Classification Search
USPC ................... 358/475, 296, 474, 1.5, 1.9, 518; 348/335; 356/124; 347/258; 250/237 G
See application file for complete search history.

(56) References Cited

U.S. PATENT DOCUMENTS 5,790,275 A * 8/1998 Iizuka ........................... 358/474
2009/0141316 A1 * 6/2009 Arai et al. ..................... 358/475

FOREIGN PATENT DOCUMENTS

JP    2006-258838 A    9/2006

* cited by examiner

*Primary Examiner* — Charlotte M Baker
*Assistant Examiner* — Rury Grisham
(74) *Attorney, Agent, or Firm* — Fitzpatrick, Cella, Harper & Scinto (57) ABSTRACT

A pupil splitting lens that splits a pupil of a light beam from a deflector into a plurality of light beams in a main scanning direction of the deflector and a pupil splitting lens that splits the light beam into a plurality of light beams in a sub-scanning direction are disposed relative to a light detection element. The light detection element detects image forming positions of the four light beams formed as a result of the splitting by the plurality of pupil splitting lenses. A CPU determines the amount of focus shift and the amount of image forming position shift from these four image forming positions.

8 Claims, 10 Drawing Sheets

F I G. 9C ical scanning apparatus used with an image forming apparatus or the like is provided with a light source that emits an optical beam for forming an electrostatic latent image on a photosensitive member. The accuracy of an image forming position of the optical beam and the accuracy of a spot diameter (beam waist position) of the optical beam on the photosensitive member affect the performance of the image forming apparatus. When the image forming position of the optical beam on the photosensitive member is not a desired position, this leads to color shift in the case of a color image forming apparatus, and when the spot diameter changes from an ideal state, fine-line reproducibility drops. Such changes in the image forming position and spot diameter of the optical beam tend to become evident as a result of employing plastic optical members. This is because the shape or refractive index of the plastic optical members changes due to environmental changes in temperature, humidity and the like.

METHOD OF MEASURING IRRADIATION POSITION SHIFT AND FOCUS SHIFT IN OPTICAL SCANNING APPARATUS

BACKGROUND OF THE INVENTION

1. Field of the Invention

The present invention relates to an optical scanning apparatus used with an image forming apparatus or the like.

2. Description of the Related Art

An optical scanning apparatus used with an image forming apparatus or the like is provided with a light source that emits an optical beam for forming an electrostatic latent image on a photosensitive member. The accuracy of an image forming position of the optical beam and the accuracy of a spot diameter (beam waist position) of the optical beam on the photosensitive member affect the performance of the image forming apparatus. When the image forming position of the optical beam on the photosensitive member is not a desired position, this leads to color shift in the case of a color image forming apparatus, and when the spot diameter changes from an ideal state, fine-line reproducibility drops. Such changes in the image forming position and spot diameter of the optical beam tend to become evident as a result of employing plastic optical members. This is because the shape or refractive index of the plastic optical members changes due to environmental changes in temperature, humidity and the like.

Change in the spot diameter is so-called focus shift. In view of this, in Japanese Patent Laid-Open No. 2006-258838, an optical scanning apparatus that employs an autofocus (AF) mechanism is proposed. According to this optical scanning apparatus, changes in focus and irradiation position are observed using a photodiode module having a V-shaped aperture slit installed in a front surface thereof.

Incidentally, phenomena such as the following arise with an optical scanning apparatus used in an image forming apparatus:

Temperature inside the image forming apparatus rises differently depending on different print modes such as intermittent printing and continuous printing;

Temperature inside the image forming apparatus rises differently depending on the surrounding environment, such as in a situation where the image forming apparatus is suddenly started up when the ambient temperature around the image forming apparatus is low, or where the temperature around the image forming apparatus is suddenly cooled from a high ambient temperature.

When the way in which the spot deteriorates thus changes depending on the change in temperature rise distribution within the image forming apparatus, it is difficult with the invention described in Japanese Patent Laid-Open No. 2006-258838 to accurately measure irradiation position shift and focus shift.

SUMMARY OF THE INVENTION

According to the present invention, a light beam from a deflector is split into a plurality of light beams in a movement direction of the light beam on a photosensitive member, as well as being split into a plurality of light beams in a direction orthogonal to the movement direction, and the image forming position of each of the light beams is detected. The plurality of image forming positions in the movement direction of the light beam and the plurality of image forming positions in the direction orthogonal to the movement direction indicate an amount of image forming position shift and an amount of focus shift in each direction. Therefore, the amount of image forming position shift and the amount of focus shift can be derived from these image forming positions. Since a light splitting unit is thus employed without using a V-shaped slit, irradiation position shift and focus shift can be measured more accurately than was conventionally possible.

Further features of the present invention will become apparent from the following description of exemplary embodiments (with reference to the attached drawings).

DESCRIPTION OF THE EMBODIMENTS

Embodiment 1

Figure 1:
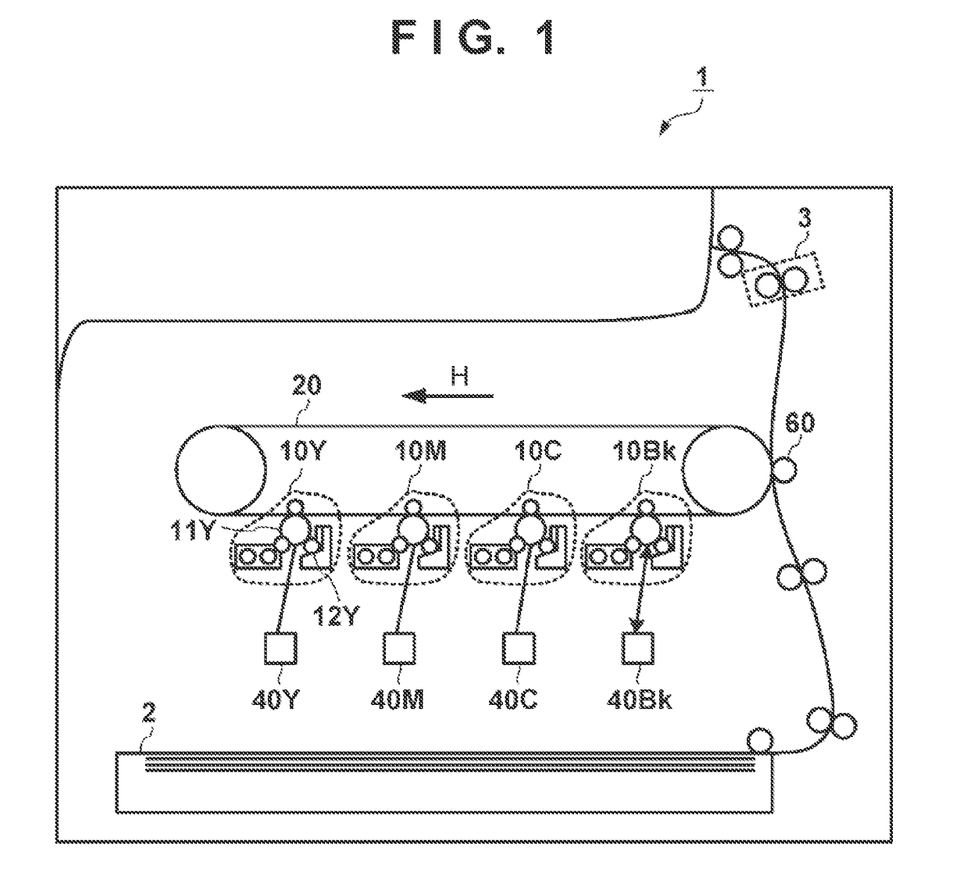
FIG. 1 is a diagram showing an exemplary image forming apparatus.

FIG. 1 is a diagram showing a tandem laser beam printer that includes a plurality of photosensitive members (photosensitive drums) and is provided with a separate optical scanning apparatus for each photosensitive member. The present invention, while taking a tandem multi-color image forming apparatus as an example, can also be applied to a monochrome image forming apparatus or a rotary multi-color image forming apparatus for forming a multi-color image on a single photosensitive drum. This is because a feature of the present invention lies mainly in the internal configuration of an optical scanning apparatus 40.

The image forming apparatus 1 includes four imaging engines 10 (10Y, 10M, 10C, 10Bk) that form toner images for each of the colors yellow (Y), magenta (M), cyan (C) and black (Bk). Since the configurations of the imaging engines are the same, hereinafter the imaging engine 10Y is described as an example. The imaging engine 10Y includes a photosensitive drum 11Y serving as an image carrier, a charger 12Y that uniformly charges the photosensitive drum 11Y, and a developing device 13Y that develops an electrostatic latent image formed on the photosensitive drum. The imaging engine 10Y functions as an imaging unit that forms an image using an optical beam irradiated by an optical scanning apparatus 40Y. The optical scanning apparatus 40Y forms an electrostatic latent image on the photosensitive drum 11Y by scanning and exposing the surface of the photosensitive drum 11Y uniformly charged by the charger 12Y, with an optical beam that depends on image data. The electrostatic latent image is developed using toner held by the developing device 13Y. The toner image formed by the imaging engine 10Y undergoes primary transfer to an intermediate transfer belt 20, and then undergoes secondary transfer using a transfer roller 60 to recording material conveyed from a sheet feeding cassette 2. The toner image on the recording material is heated and pressurized by a fixing device 3, and fixed to the recording material.

With the image forming apparatus 1, the optical scanning apparatuses 40 (40Y, 40M, 40C, 40Bk) thus expose the photosensitive drum of the respective imaging engines at a predetermined timing, according to image information of each color. In order to obtain a product having good image quality, the position at which the electrostatic latent image is formed on each photosensitive drum needs to be controlled with high accuracy by each optical scanning apparatus so that the toner images formed by the imaging engines overlap on the recording material without any shift. Furthermore, the spot diameter of the optical beam on the photosensitive drum also needs to be very small (predetermined spot diameter) as intended. If the position of the toner images shifts from a target position or the spot diameter becomes larger than a target size when a plurality of toner images of different colors are overlaid, image quality drops because of the occurrence phenomena such as color shift, image jaggedness and insufficient fineline reproducibility. For this reason, a color shift correction mechanism that performs color matching with high accuracy and a spot diameter guarantee mechanism that guarantees a desired spot diameter on the photosensitive drum are needed in the image forming apparatus 1, in pursuit of higher definition.

Generally, a color shift correction mechanism forms a plurality of patches of respectively different colors on the intermediate transfer belt 20, reads the patches with an imaging sensor, and detects relative formation position shift between the patches from the reading results. Configurations that correct the formation positions of the toner images based on the results of detecting relative formation position shift are the most common. However, with this patch technique, time during which image forming cannot be performed arises due to executing a color shift correction sequence. Therefore, this patch color shift correction sequence cannot be executed frequently from the viewpoint of usability. For example, this color shift correction sequence is executed automatically every time image forming has been performed on, for example, 1000 sheets of recording material.

While a spot diameter guarantee mechanism is generally realized by an autofocus mechanism, it is necessary to determine the drive direction of the lens after detecting whether the beam waist position is on the light source side or the opposite side to the light source relative to the surface of the photosensitive drum. This detection operation is a hindrance when trying to improve the productivity of image forming apparatuses.

It is also conceivable to provide the optical scanning apparatus 40 with separate mechanisms for reading position shift and spot shift in order to resolve the above two problems, but space restrictions and the like greatly reduce design freedom. In view of this, in the present embodiment, a simple configuration that can be miniaturized and is capable of correcting image forming position shift and focus shift (spot diameter shift or beam waist position shift) is proposed.

Figure 2A:
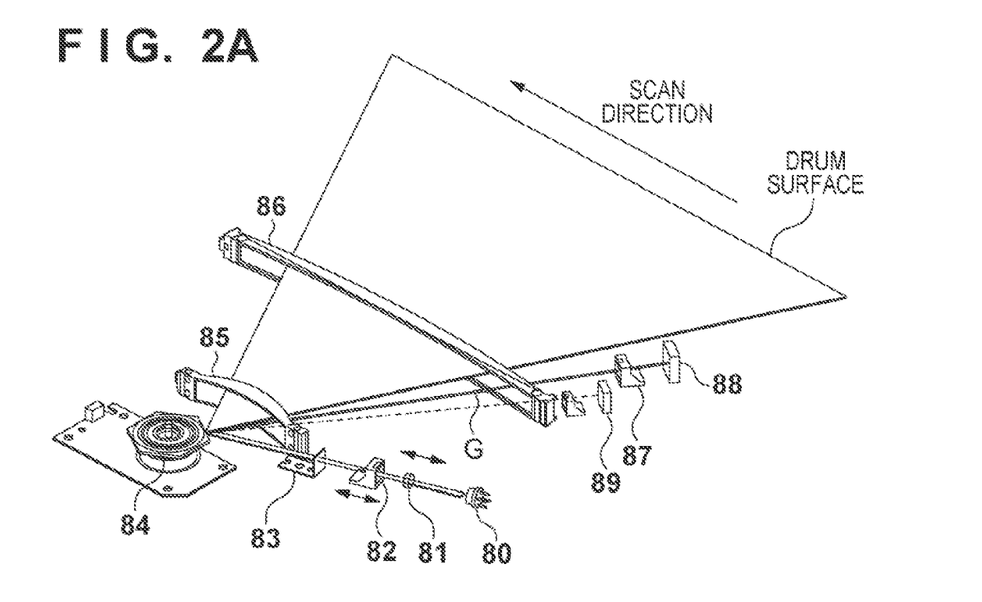
FIGS. 2A and 2B are diagrams showing a schematic configuration of an optical scanning apparatus that detects and corrects image forming position shift and focus shift with high accuracy according to the embodiments.
Figure 2B:
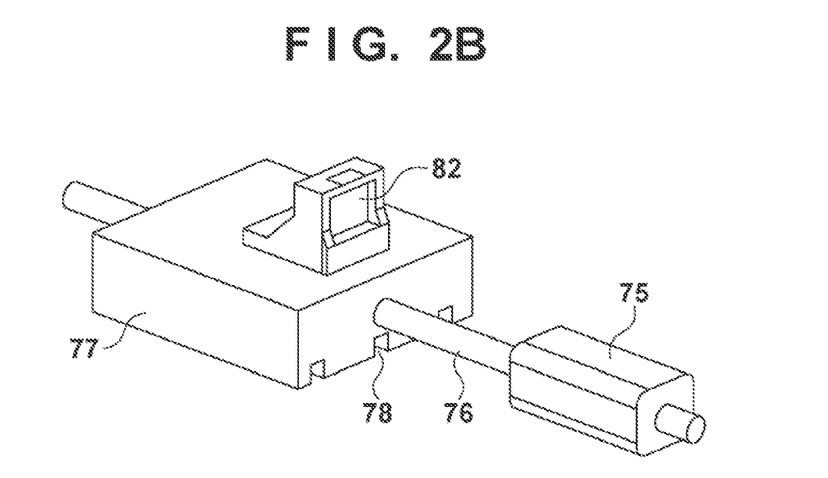

FIG. 2A and FIG. 2B are diagrams showing schematic configurations of the optical scanning apparatus 40 that detects and corrects image forming position shift and focus shift with high accuracy according to the embodiments. A light source 80 that emits a light beam (optical beam), a deflector 84 that reflects or deflects the optical beam, a plurality of optical members that direct the optical beam onto a scanning surface to form an image, and a casing (not illustrated) for fixing and holding these optical-related members are provided inside and on the periphery of the optical scanning apparatus 40. The plurality of optical members that direct the optical beam onto the scanning surface to form an image include an optical lens 81 that is a condensing lens, an optical lens 82 such as a cylindrical lens, and optical lenses 85 and 86 that function as fθ lenses. The optical lenses 81 and 82 are exemplary optical members through which the light beam output from the light source passes. Also, the deflector 84 is an exemplary deflector (rotating polygon mirror, galvanometer mirror, etc.) that deflects and scans the light beam that has passed through the optical members.

Light emitted from the light source 80 passes through the optical lenses 81 and 82 provided in an incident optical beam area, and furthermore passes through an aperture 83. The aperture 83 functions as a diaphragm that eliminates unnecessary light. Light that has passed through the aperture 83 is guided to the deflector 84. Light that is incident on the deflector 84 is condensed in the sub-scanning direction, and shaped into a linear optical beam.

Light scanned by the deflector 84 so as to move in a predetermined direction over the photosensitive drum passes through the optical lens 85 which mainly has refractive power (hereinafter, power) in the main scanning direction (corresponds to the movement direction of the optical beam on the photosensitive member) and the optical lens 86 which mainly has power in the sub-scanning direction, and is guided onto the surface of the photosensitive drum. Light scanned at a constant angular velocity by the deflector 84 is scanned at a constant velocity on the surface of the photosensitive drum as a result of the fθ characteristics of the optical lenses 85 and 86.

The light scanning area is divided into an image area that contributes to image formation and a non-image area that does not contribute to image formation. In FIG. 2A, in particular, the image area is shown by a triangle. An optical beam G scanned in the non-image area is guided to a pupil splitting member 87 that is discussed later. The optical beam G is split into a plurality of optical beams by the pupil splitting member 87 before reaching a light detection element 88. In FIG. 2A, the pupil splitting member 87, the light detection element 88 and the like are disposed in the non-image area on the upstream side in the scanning direction, but may be disposed in the non-image area on the downstream side in the scanning direction.

The optical lenses 81 and 82 are optical lenses respectively having power for refracting the optical beam in the main scanning direction or in both the main scanning direction and the sub-scanning direction. Moving the optical lenses 81 and 82 in the optical axis direction enables the focus of the optical beam for forming an image on the surface of the photosensitive drum to be adjusted.

A light detection element 89, which is a BD (beam detect) sensor such as a photodetector, outputs a BD signal that is a reference signal for determining the write start timing in the main scanning direction (direction in which the optical beam moves on the photosensitive drum). The light detection element 89 is also disposed in the non-image area. In FIG. 2A, the light detection element 89 is disposed in the non-image area on the upstream side in the main scanning direction, but may be disposed in the non-image area on the downstream side.

FIG. 2B is a diagram showing a movement mechanism that moves the optical lens 82. A similar movement mechanism can also be employed for the optical lens 81. The optical lens 82 is held and fixed by a fixing base 77 configured so as to be movable along a rail that is not illustrated. The fixing base 77 has grooves 78 provided in parallel with the optical axis direction of the optical beam. Rail-like protrusions provided in the casing of the optical scanning apparatus 40 engage the grooves 78. The optical lens 82 is thereby held so as to not rotate side to side or up and down relative to the optical axis. A screw portion 76 is provided in the rotary shaft of a motor 75. The screw portion 76 is threaded into a screw hole provided in the fixing base 77. In other words, the screw portion 76 and the screw hole form a screw mechanism. As a result of rotating the screw portion 76 using the power of the motor 75, the fixing base 77 and the optical lens 82 move in the optical axis direction of the optical lens 82. Note that the optical lens 81 is similarly provided with a configuration for moving the optical lens 81 along the optical axis of the optical lens 81, and the optical lens 81 can also be moved in the direction of the arrow as shown in FIG. 2A. The optical lens 81 and the optical lens 82 are each driven independently.

Figure 3A:
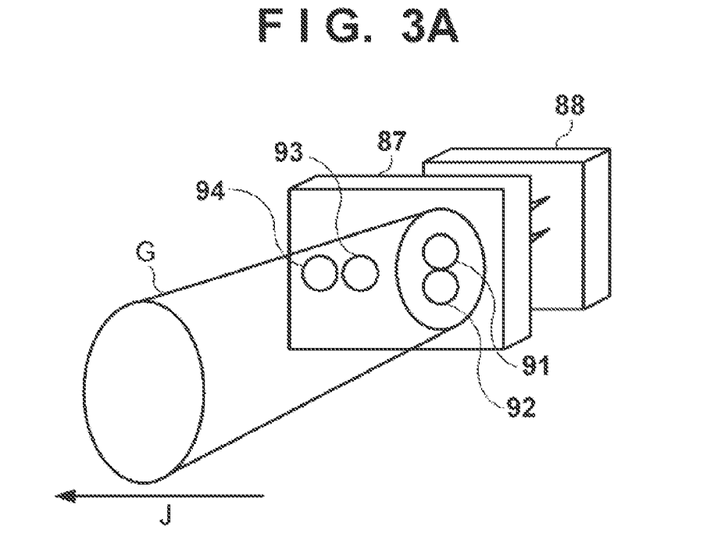
FIGS. 3A and 3B are schematic views of a pupil splitting member and a light detection element.
Figure 3B:
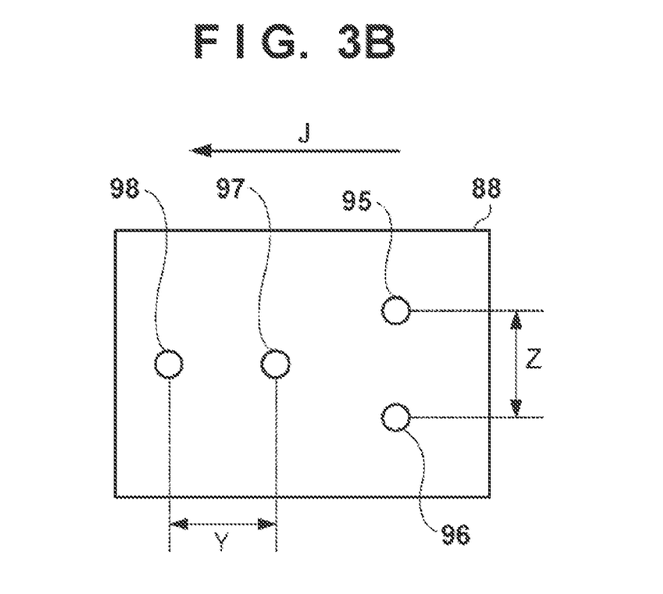

FIG. 3A and FIG. 3B are diagrams showing schematic configurations of the pupil splitting member 87 and the light detection element 88. An arrow J indicates the scanning direction of the optical beam. The pupil splitting member 87 is provided with four pupil splitting lenses 91, 92, 93 and 94. The pupil splitting member 87 is provided on the optical path of the optical beam G between the deflector 84 and the light detection element 88, such that moments arise where at least the pupil splitting lenses 91 and 92 or the pupil splitting lenses 93 and 94 are simultaneously positioned inside the spot diameter of the scanned optical beam G. The pupil splitting lenses 91, 92, 93 and 94 are optical lenses respectively having power. The pupil splitting lenses 91 and 92 are lenses that split the light beam in the sub-scanning direction, and the pupil splitting lenses 93 and 94 are lenses that split the light beam in the main scanning direction. Note that although two lenses are employed here in both the main scanning direction and the sub-scanning direction, this is to allow the most concise description. Therefore, in terms of the technical idea of the present invention, there may be three or more lens. In this way, the pupil splitting lenses 93 and 94 form an exemplary first light splitting unit that splits the light beam from the deflector into a plurality of light beams in a scanning direction of the deflector. Also, the pupil splitting lenses 91 and 92 form an exemplary second light splitting unit that splits the light beam from the deflector into a plurality of light beams in a direction orthogonal to the scanning direction of the deflector. In the following, the pupil splitting lenses 93 and 94 are collectively referred to as the first light splitting unit, and the pupil splitting lenses 91 and 92 are collectively referred to as the second light splitting unit.

The optical beam G incident on the pupil splitting member 87 is split in the sub-scanning direction by the pupil splitting lenses 91 and 92 and is split in the main scanning direction by the pupil splitting lenses 93 and 94. The four split optical beams form an image on the detection surface of the light detection element 88. The light detection element 88, which is an area sensor constituted by an image sensor such as a CCD or CMOS image sensor, detects the position of the condensing point of each of the split light beams. The light detection element 88 is an exemplary image forming position detection unit that detects the image forming positions of the plurality of light beams split by the first light splitting unit, and the image forming positions of the plurality of light beams output from the second light splitting unit.

Condensing points 95, 96, 97 and 98 of the four split optical beams shown in FIG. 3B correspond respectively to the pupil splitting lenses 91, 92, 93 and 94. The distance between the condensing points 95 and 96 is defined as Z, and the distance between the condensing points 97 and 98 is defined as Y. In the present embodiment, the focus position (focus shift) and the image forming position are estimated from the distances Y and Z. Here, the initial distances (intervals) between the condensing points is detected using a predetermined jig in a state where the image forming position and focus of the optical beam have been adjusted with high accuracy such as when the optical scanning apparatus 40 is manufactured, and the data of the distances between condensing points is recorded in a memory mounted in the optical scanning apparatus 40, or the like. This data serves as a target value of the distance between the condensing points 95 and 96 and as a target value of the distance between the condensing points 97 and 98 when adjusting the condensing points using the AF function. Using these values as target values, a motor that respectively moves the optical lenses 81 and 82 is feedback controlled according to the shift from the target values. Even if changes in the environment or durability of the optical scanning apparatus 40 arise, image forming position shift and focus shift in both the sub-scanning direction and the main scanning direction can thereby be corrected. Note that the image forming positions may also be called exposure positions or irradiation positions.

Figure 4A:
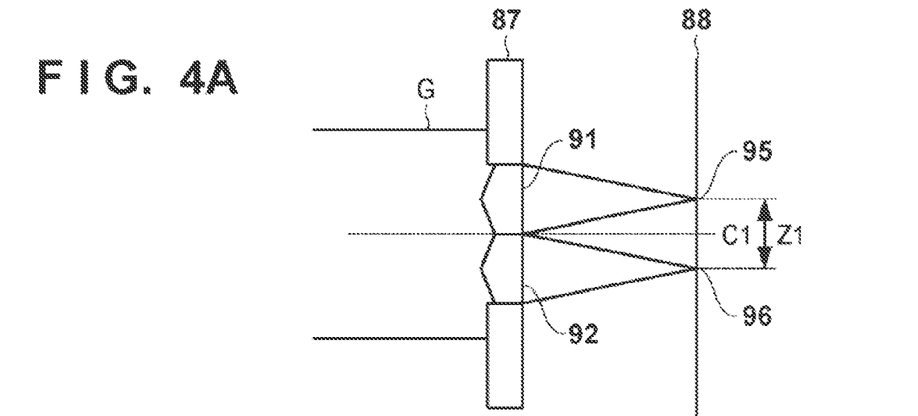
FIG. 4A is a diagram showing an initial state.
Figure 4B:
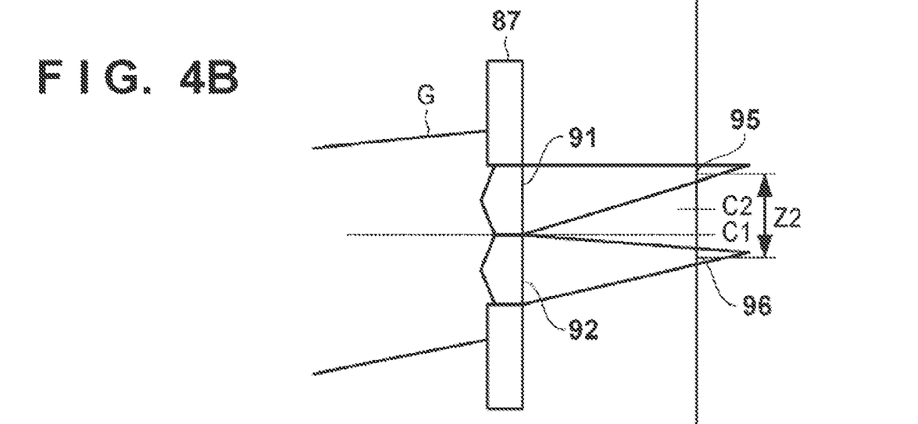
FIGS. 4B and 4C are diagrams showing changed states.

The mechanism for detecting focus shift and image forming position shift with a single scan is described using FIG. 4A and FIG. 4B. FIG. 4A is a diagram showing an initial state (ideal state), and FIG. 4B is a diagram showing a changed state. Only the sub-scanning direction is described in order to simplify the description. Within the main body of the image forming apparatus 1, heat is generated by the driving of the optical scanning apparatus 40, and other units such as the fixing device 3 also generate heat. Focus shifts and image forming positions change due to propagation of this heat. As shown in FIG. 4B, when focus shift arises the distance between the two optical beams condensed on the detection surface of the light detection element 88 changes from Z1 to Z2.

Figure 4C:
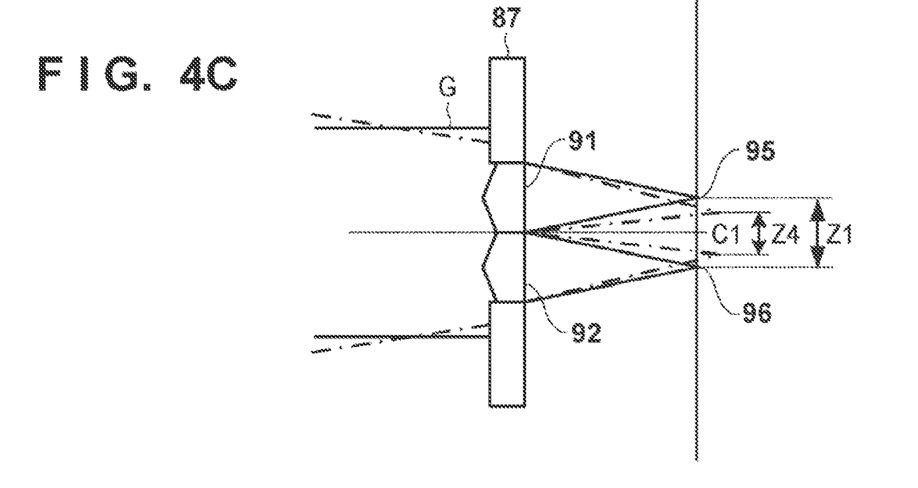

FIG. 4C is a diagram showing a change in the image forming positions on the light detection element 88 of the optical beams split by the pupil splitting member 87 when focus shift occurs and when focus shift does not occur in a state where the image forming positions of the optical beams are in ideal positions. The solid lines show the optical path of the optical beam in the case where focus shift does not occur and the dashed-dotted chain lines show the optical path of the optical beam in the case where focus shift occurs.

As shown in FIG. 4C, the angle of incidence of the end of the light beam flux of the optical beam G that is incident on the pupil splitting member 87 differs in the case where focus shift occurs and in the case where focus shift does not occur. Thus, the image forming positions of the optical beams split by the pupil splitting member 87 also differ. That is, a distance Z4 between the two optical beams in the case where focus shift occurs is different from a distance Z1 between the two optical beams in the case where focus shift does not occur. Thus, the amount of focus shift can be determined from the difference between Z1 and Z4.

When image forming position shift arises, an intermediate position C1 between the image forming positions of the two optical beams changes to C2. Here, since Z1 and C1 are known, the amount of focus shift is obtained by measuring the distance Z2, and the amount of image forming position shift is obtained by measuring the intermediate position C2.

Here, the data Z1 and C1 in the initial state shown in FIG. 4A are numerical data computed from the position of the center of gravity of the light beams for the pixel positions on the detection surface of the light detection element 88. Z1 and C1 are stored in a memory on an electric substrate provided in the main body of the image forming apparatus 1 or in the optical scanning apparatus 40.

Note that, in the present embodiment, the position data of two image forming points is required in the sub-scanning direction, and the position data of two image forming points is also required in the main scanning direction. In order to acquire these four pieces of position data in a single scan, it is necessary to distinguish whether position data obtained from the light detection element 88 is the position data of the two image forming points in the sub-scanning direction or the position data of the two image forming points in the main scanning direction, based on the timing of the scan. Furthermore, as regards the main scanning direction, the position data of the two image forming points cannot easily be acquired. This is because the scanning direction of the optical beam is the same as the direction of the interval of the image forming points. In other words, when trying to measure the image forming points with the optical beam continuously turned on, the locus of the optical beam will be a straight line, making it impossible to separate the two image forming points. In view of this, in the present embodiment, light emission timing is controlled so that the light source 80 emits light momentarily at the scan timing at which the optical beam crosses the center of the pupil splitting lenses 93 and 94. In other words, the light source is turned on for the first time at the timing at which the optical beam is incident on the pupil splitting lenses 91 and 92, and after being turned off, the light source is turned on at the timing at which the optical beam crosses the center of the pupil splitting lenses 93 and 94. At this time, the light source is turned off so that the spot of the optical beam separated by the pupil splitting lens 93 and the spot of the optical beam split by the pupil splitting lens 94 are not connected on the light detection element. Note that the optical beam may be constantly turned on at the timing at which the position data of the image forming points for the sub-scanning direction is acquired. This is because the loci of the two image forming points will be two straight lines. Therefore, if the distance between the two straight lines is measured, the measured value will be Z. Of course, the light emission timing may be controlled so that the light source 80 emits light only at the scan timing at which the optical beam crosses the center of the pupil splitting lenses 91 and 92. In this way a single scan thus includes the timing at which the position data of the image forming points for the main scanning direction is acquired and the timing at which the position data of the image forming point for the sub-scanning direction is acquired.

In the present embodiment, measuring the positions of four image forming points in this way enables focus shift and irradiation position shift to be detected with a single scan. Also, in the present invention, both can be accurately detected while achieving space-saving.

Focus is corrected by converting the detected focus shift into an amount of movement of the optical lens 81 and the optical lens 82 (drive amount of the motor 75), and moving the optical lens 81 and the optical lens 82 in the optical axis direction by the amount of movement. Amounts of movement relative to amounts of focus shift are expressed in advance as a table or a formula, and this table or formula is stored in memory.

Similarly, image forming position shift in the main scanning direction decreases, as a result of converting the image forming position shift in the main scanning direction into an amount of adjustment of the write start position in the main scanning direction of the optical beam in the image area, and adjusting the write start position by this adjustment amount. Similarly, image forming position shift in the sub-scanning direction decreases, as a result of converting the image forming position shift in the sub-scanning direction into an amount of adjustment of the write start position in the sub-scanning direction of the optical beam in the image area, and adjusting the start position by this adjustment amount. Amounts of adjustment relative to amounts of image forming position shift are expressed in advance as a table or a formula, and this table or formula is stored in memory.

Reducing focus shift and image forming position shift in this way enables the correction time to be greatly reduced as compared with the patch method. In other words, since the abovementioned downtime can be reduced, a good quality image having little color shift can be provided while improving usability.

In the present embodiment, fixed-point light emission for emitting light sporadically at a timing decided based on a reference signal such as a BD signal output in response to the light detection element 89 detecting the optical beam is employed. Focus shift and image forming position shift in the main scanning direction can also thereby be accurately detected. Therefore, focus shift and image forming position shift in the main scanning direction can also be corrected in real time similarly to the sub-scanning direction. Note that fixed-point light emission can be realized using a counter that starts counting a reference clock when a BD signal is input. As a result of the light source 80 emitting light for a predetermined number of seconds when the value of the counter reaches a predetermined value t1, the position data of the two image forming points for deriving focus shift and image forming position shift in the sub-scanning direction is obtained. Next, as a result of the light source 80 emitting light for a predetermined number of seconds when the value of the counter reaches a predetermined value t2, the position data of the two image forming points for deriving focus shift and image forming position shift in the main scanning direction is obtained. Thereafter, since the period during which the value of the counter is between a predetermined value t3 and a predetermined value t4 is equivalent to the image area, the light source 80 emits light while adjusting the amount of light according to the image data.

Figure 5:
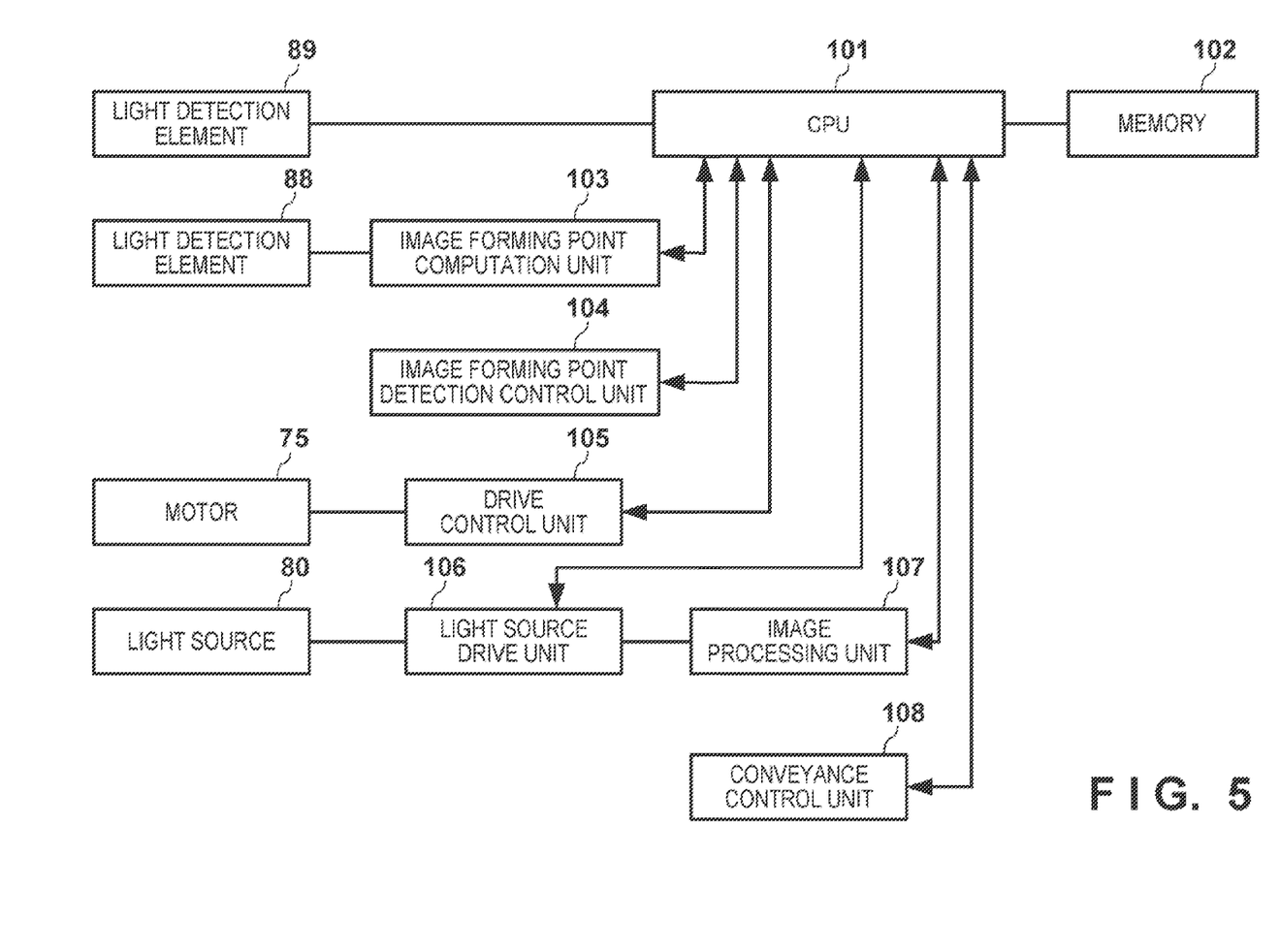
FIG. 5 is a diagram showing a control unit that is responsible for correcting focus shift and image forming position shift.

FIG. 5 is a diagram showing a control unit that is responsible for correcting focus shift and image forming position shift. A CPU 101 performs overall control of focus shift and image forming position shift detection processing and correction processing in accordance with programs and data stored in a memory 102. Also, the CPU 101 incorporates a counter that counts the reference clocks output from a reference clock generation unit that is not illustrated, and a counter that counts the number of sheets that are image formed after performing a predetermined control. The memory 102 is constituted by ROM which is a nonvolatile storage medium, RAM which is a volatile storage medium, or the like. An image forming point computation unit 103 computes the position data, the distances Y and Z, and the intermediate position C of the image forming points from the data output from the light detection element 88. Note that the CPU 101 may execute the function of the image forming point computation unit 103. An image forming point detection control unit 104 handles light emission control of the light source 80 for detecting image forming points, and the like. A drive control unit 105 controls the motor 75 to move the optical lenses 81 and 82 by the amount of movement computed by the CPU 101. A light source drive unit 106 turns the light source 80 ON/OFF according to an ON instruction or an OFF instruction from the CPU 101. An image processing unit 107 generates a pulse width modulation (PWM) signal according to the image data, and supplies the generated PWM signal to the light source drive unit 106. A conveyance control unit 108 controls the conveyance timing of recording material. As a result of the CPU 101 synchronizing the image write start timing in the sub-scanning direction and the conveyance timing of recording material, an image is formed in a desired position on the recording surface of the recording material.

Figure 6:
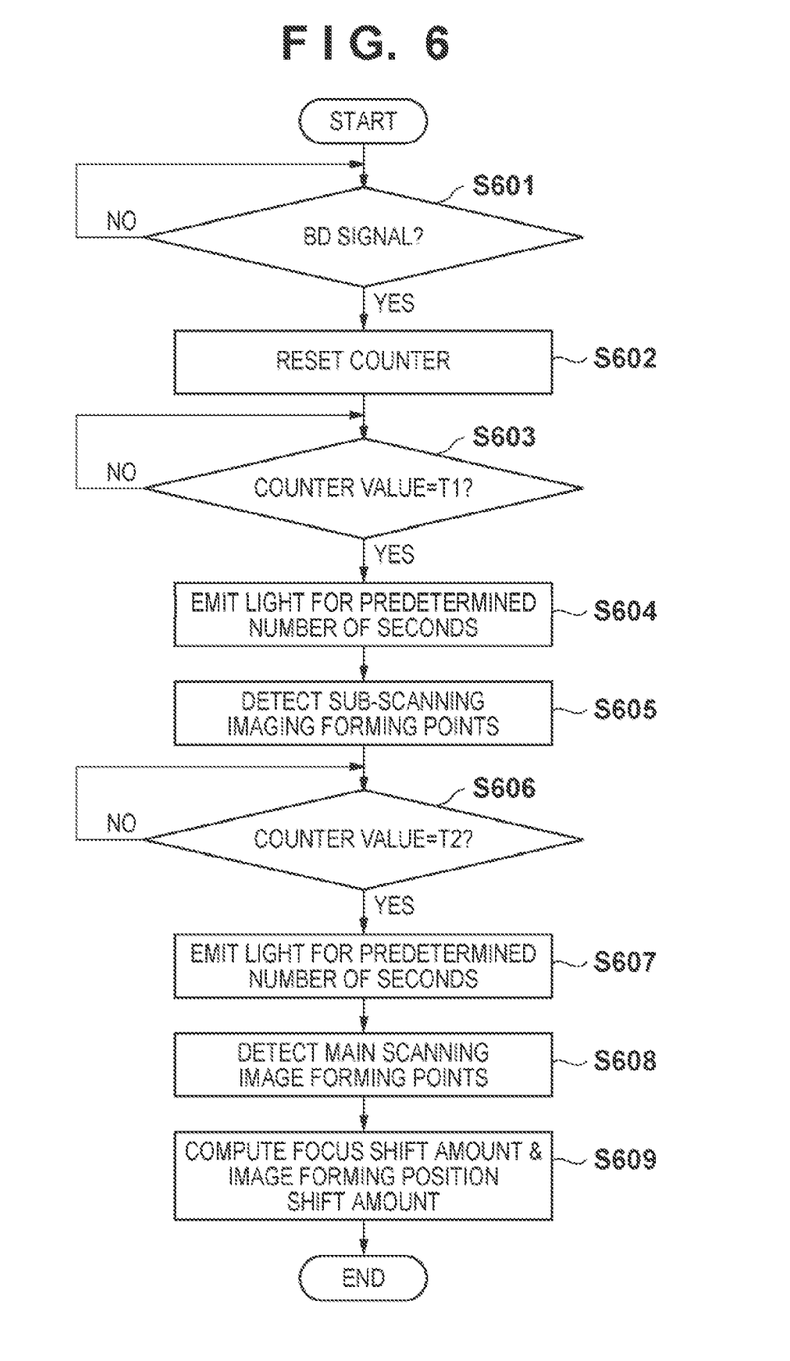
FIG. 6 is a flowchart showing processing for detecting focus shift and image forming position shift.

FIG. 6 is a flowchart showing processing for correcting focus shift and image forming position shift that is executed by the CPU 101. Correction processing is started by the CPU 101 when the number of sheets image formed after correction processing was last executed exceeds a threshold number of sheets, or when the internal temperature of the image forming apparatus exceeds a threshold temperature. The CPU 101 counts the number of image formed sheets using the internal counter, and measures the internal temperature using a temperature sensor that is not illustrated. The CPU 101, after having checked that the deflection speed (rotation speed in the case of a polygon mirror) of the deflector 84 is stable, instructs the light source drive unit 106 to start driving the light source 80.

At S601, the CPU 101 determines whether a BD signal (reference signal) has been output from the light detection element 89 functioning as a BD sensor. The CPU 101 notifies the image forming point detection control unit 104 that a BD signal has been output, and proceeds to S602. At S602, the CPU 101 instructs the image forming point detection control unit 104 and thereby causes the counter to be reset.

At S603, the CPU 101 instructs the image forming point detection control unit 104 and thereby causes the counter value to be acquired from the counter and it to be determined whether the counter value is the predetermined value t1. The predetermined value t1 corresponds to the time (count value) from the timing at which the optical beam G is detected by the light detection element 89 (counter reset timing) to the timing at which the optical beam G passes through the pupil splitting lenses 91 and 92 for the sub-scanning direction. When the counter value reaches t1, the image forming point detection control unit 104 outputs a fixed-point light emission instruction to the light source drive unit 106, and proceeds to S604.

At S604, the CPU 101 instructs the light source drive unit 106 and thereby causes the light source 80 to emit light for a predetermined time based on the received fixed-point light emission instruction. At S605, the CPU 101 instructs the image forming point computation unit 103 and thereby causes position data of the two image forming points (condensing points 95 and 96) in the sub-scanning direction to be calculated from the pixel data output from the light detection element 88. The plurality of pixel data per image forming point is data indicating that light has been received. Thus, the image forming point computation unit 103, by computing the center of gravity of the positions of the plurality of pixels, determines the computed center of gravity to be the position data of the image forming point. The position data of the image forming points is initially stored in the memory 102.

At S606, the CPU 101 instructs the image forming point detection control unit 104 and thereby causes the counter value to be acquired from the counter and it to be determined whether the counter value is the predetermined value t2. The predetermined value t2 corresponds to the time (count value) from the timing at which the optical beam G is detected by the light detection element 89 (counter reset timing) to the timing at which the optical beam G passes through the pupil splitting lenses 93 and 94 for the main scanning direction. When the counter value reaches t2, the image forming point detection control unit 104 outputs a fixed-point light emission instruction to the light source drive unit 106, and proceeds to S607.

At S607, the CPU 101 instructs the light source drive unit 106 and thereby causes the light source 80 to emit light for a predetermined time based on the received fixed-point light emission instruction. At S608, the CPU 101 instructs the image forming point computation unit 103 and thereby causes position data of the two image forming points in the main scanning direction to be computed from the pixel data output from the light detection element 88. The plurality of pixel data per image forming point is data indicating that light has been received. Thus, the image forming point computation unit 103, by computing the center of gravity of the positions of the plurality of pixels, determines the computed center of gravity to be the position data of the image forming point. The position data of the image forming points is initially stored in the memory 102.

At S609, the CPU 101 reads out the position data of the image forming points for the sub-scanning direction from the memory 102, computes a distance Z2 and an intermediate position C2, and stores the computation results in the memory 102. Furthermore, the CPU 101 derives the difference between the target distance Z1 and the distance Z2 read out from the memory 102, and converts this difference into an amount of focus shift in the sub-scanning direction. The CPU 101 derives the difference between the target intermediate position C1 and the intermediate position C2 read out from the memory, and converts this difference into an amount of image forming position shift in the sub-scanning direction. In other words, the CPU 101 functions as a second image forming position distance computation unit that computes a distance between the image forming position of a first light beam and the image forming position of a second light beam among the plurality of light beams split by the second light splitting unit, and as a difference computation unit that computes a difference between the computed distance Z2 and a predetermined target distance Z1. Also, the CPU 101 functions as a second midpoint computation unit that computes a midpoint C2 between the image forming position of the first light beam and the image forming position of the second light beam among the plurality of light beams split by the second light splitting unit, and as a second midpoint distance computation unit that computes a distance between the midpoint C2 computed by the second midpoint computation unit and a predetermined target point C1.

Similarly, the CPU 101 reads out the position data of the image forming points for the main scanning direction from the memory 102, computes a distance Y2 and an intermediate position C4, and stores the computation results in the memory 102. Furthermore, the CPU 101 derives the difference between the distance Y2 and the target distance Y1 for the main scanning direction read out from the memory 102, and converts this difference into an amount of focus shift in the main scanning direction. The CPU 101 derives the difference between the intermediate position C4 and a target intermediate position C3 for the main scanning direction read out from the memory 102, and converts this difference into an amount of image forming position shift in the main scanning direction. The CPU 101 functions as a first image forming position distance computation unit that computes a distance Y2 between the image forming position of a first light beam and the image forming position of a second light beam among the plurality of light beams split by the first light splitting unit, and as a difference computation unit that computes a difference between the computed distance Y2 and a predetermined target distance Y1. Also, the CPU 101 functions as a first midpoint computation unit that computes a midpoint C4 between the image forming position of the first light beam and the image forming position of the second light beam among the plurality of light beams split by the first light splitting unit, and as a first midpoint distance computation unit that computes a distance between the midpoint C4 computed by the first midpoint computation unit and a predetermined target point C3.

In this way, the CPU 101 functions as a shift amount determination unit that determines, from the image forming positions of the plurality of light beams split by the first light splitting unit, an amount of focus shift which is an amount of shift relative to a target diameter of the spot diameter of the light beams in the scanning direction and an amount of image forming position shift which is an amount of shift relative to a target position of the image forming positions of the light beams in the scanning direction. Similarly, the CPU 101 functions as a shift amount determination unit that determines the amount of focus shift and the amount of image forming position shift in the direction orthogonal to the scanning direction, from the image forming positions of the plurality of light beams split by the second light splitting unit.

Figure 7:
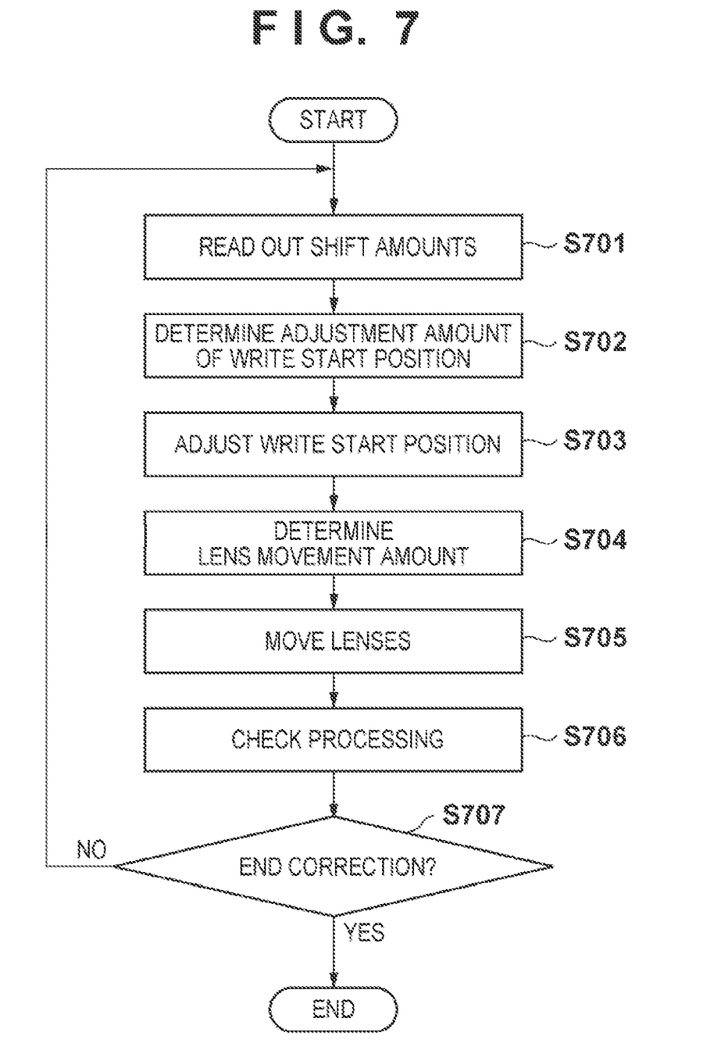
FIG. 7 is a flowchart showing processing for correcting focus shift and image forming position shift.

FIG. 7 is a flowchart showing processing for correcting focus shift and image forming position shift. Correction processing is executed following detection processing. Focus shift, in particular, is corrected by autofocus.

At S701, the CPU 101 reads out the data of each shift amount from the memory 102. At S702, the CPU 101 converts the data of the image forming position shift amount in the main scanning direction into an amount of adjustment of the image write start position in the main scanning direction using the above-mentioned function or table. Similarly, the CPU 101 converts the data of the image forming position shift amount in the sub-scanning direction into an amount of adjustment of the image write start position in the sub-scanning direction using the above-mentioned function or table. In this way, the CPU 101 functions as a first adjustment amount determination unit that determines an amount of adjustment corresponding to the distance between the midpoint C4 and the predetermined target point C3 computed by the first midpoint distance computation unit using a function or a table, and as a second adjustment amount determination unit that determines an amount of adjustment corresponding to the distance between the midpoint C2 and the predetermined target point C1 computed by the second midpoint distance computation unit using a function or a table.

At S703, the CPU 101 adjusts the image write start position in the main scanning direction by the determined adjustment amount of the image write start position in the main scanning direction, and adjusts the image write start position in the sub-scanning direction by the determined adjustment amount of the image write start position in the sub-scanning direction. In this way, the CPU 101 functions as an adjustment unit that adjusts a write start timing of the light beam from the light source in the scanning direction by a first adjustment amount corresponding to an amount of image forming position shift in the scanning direction derived as the amount of shift relative to a first target position of the image forming positions of the plurality of light beams split by the first light splitting unit. Similarly, the CPU 101 functions as an adjustment unit that adjusts a write start timing of the light beam from the light source in the direction orthogonal to the scanning direction by a second adjustment amount corresponding to an amount of image forming position shift in the direction orthogonal to the scanning direction derived as the amount of shift relative to a second target position of the image forming positions of the plurality of light beams split by the second light splitting unit.

At S704, the CPU 101 converts the data of the focus shift amount in the main scanning direction and the focus shift amount in the sub-scanning direction into an amount of movement of the optical lenses 81 and 82 using the above-mentioned function or table. In other words, the CPU 101 functions as a first movement amount determination unit that determines an amount of movement corresponding to the difference between the computed distance Y2 and the predetermined target distance Y1 using a function or a table, and as a second movement amount determination unit that determines an amount of movement corresponding to the difference between the computed distance Z2 and the predetermined target distance Z1 using a function or a table.

At S705, the CPU 101 instructs the drive control unit 105 to move the optical lenses 81 and 82 by the determined amount of movement. The drive control unit 105 drives the motor 75 according to the drive amount. In this way, the drive control unit 105 and the motor 75 function as a movement unit that moves the optical members in the optical axis direction of the light beam by an amount of movement corresponding to the focus shift amount in the scanning direction and the focus shift amount in the direction orthogonal to the scanning direction.

At S706, the CPU 101 executes check processing for checking whether the amount of focus shift and the amount of image forming position shift have decreased sufficiently. In this check processing, the abovementioned steps S601 to S609 are performed again. At S707, the CPU 101 determines whether a correction end condition is satisfied. The correction end condition is that the four shift amounts acquired as a result of the check processing are less than or equal to corresponding thresholds. Note that when the shift amount correction processing is executed a large number of times, downtime increases and usability drops. In view of this, the correction processing frequency exceeding a threshold frequency may also be set as a correction end condition. When any one of the correction end conditions is satisfied, the CPU 101 ends the correction processing. When none of the correction end conditions are satisfied, the CPU 101 returns to S701 and repeats the correction processing.

According to Embodiment 1, the pupil of the light beam from a deflector is split into a plurality of light beams in a scanning direction of the deflector and is split into a plurality of light beams in a direction orthogonal to the scanning direction, and image forming positions of the respective light beams are detected. Since a light beam splitting unit is employed, without using a sensor accompanied by a V-shaped slit as was conventionally the case, irradiation position shift and focus shift can be measured more accurately than was conventionally possible. Since irradiation position shift and focus shift can be measured more accurately than was conventionally possible, shift correction accuracy also increases.

Also, according to the present invention, since the amount of irradiation position shift and the amount of focus shift can be measured with a single scan, adjustment of the beam waist position, write timing and the like can be executed in a shorter time than was conventionally possible. Note that the CPU 101 may calculate an average value from a plurality of measurement results, and this average value may be used in the adjustment processing.

Embodiment 2

Figure 8:
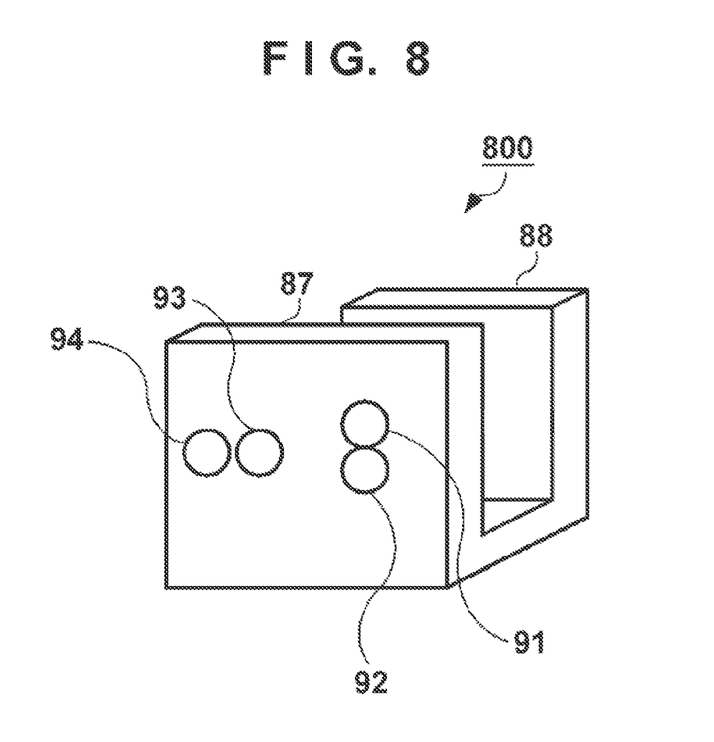
FIG. 8 is a diagram showing a unit configured by unifying the pupil splitting member and the light detection element according to Embodiment 2.

In Embodiment 2, a structure unifying the first light splitting unit, the second light splitting unit and the detection unit is proposed. This structure makes it possible to suppress shifting of the relative positional relationship of the pupil splitting member 87 and the light detection element 88 due to heating up of the optical scanning apparatus 40, and accurately compute the amount of irradiation position shift and the amount of focus shift.

FIG. 8 is a diagram showing a unit 800 configured by unifying the pupil splitting member 87 and the light detection element 88 according to Embodiment 2. Here, description common to Embodiment 1 is omitted. With the unit 800 shown in FIG. 8, the pupil splitting member 87 and the light detection element 88 are integrally supported and fixed. A large change in the relative positions of the pupil splitting lenses 91, 92, 93 and 94 and the light detection element 88 can thereby be suppressed, even in the case where the shape of the casing of the optical scanning apparatus 40 is deformed due to heating up or the like. As a result, the amount of irradiation position shift and the amount of focus shift can be accurately computed.

Embodiment 3

Figure 9A:
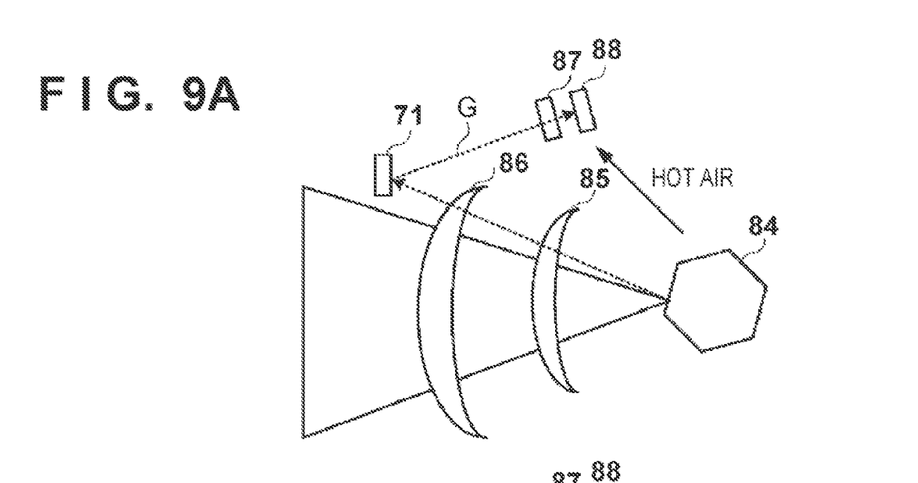
FIG. 9A is a diagram showing disposition of the pupil splitting member and the light detection element that is easily affected by hot air from a deflector.
Figure 9B:
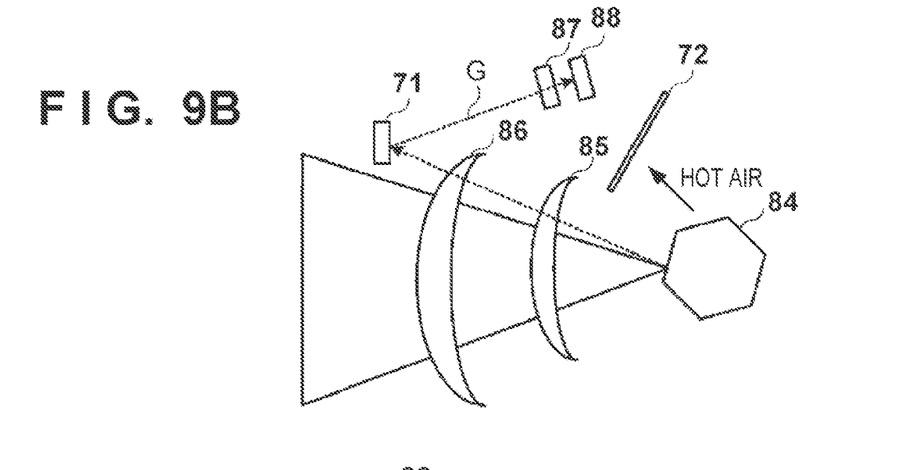
FIG. 9B is a diagram showing a shielding member.
Figure 9C:
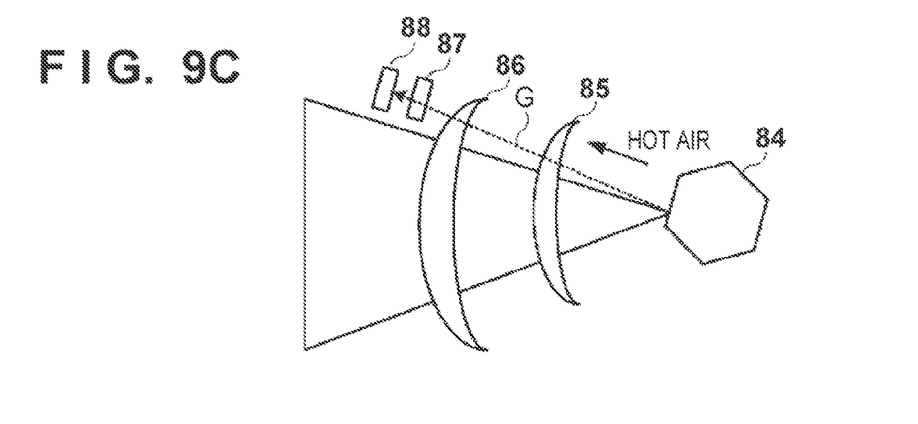
FIG. 9C is a diagram showing disposition of the pupil splitting member and the light detection element that enables optical lenses to be utilized as shielding members.

In Embodiment 3, a structure is proposed in which a shielding member that suppresses hot air from the deflector from directly hitting the second light splitting unit is disposed on at least one of a straight line connecting the deflector and the detection unit, a straight line connecting the deflector and the first light splitting unit, and a straight line connecting the deflector and the second light splitting unit. The influence that hot air from the deflector 84 of the optical scanning apparatus 40 exerts on the pupil splitting member 87 and the light detection element 88 is thereby suppressed, enabling the amount of irradiation position shift and the amount of focus shift to be accurately computed.

FIG. 9A is a diagram showing disposition of the pupil splitting member 87 and the light detection element 88 that is easily affected by hot air from the deflector 84. In this example, the optical beam G is reflected back by a reflective mirror 71, and directed toward the pupil splitting member 87. It should be noted that when such a disposition has to be employed in order to achieve space-saving, hot air generated by the rotation of the deflector 84 directly hits the pupil splitting member 87 and the light detection element 88. The fact that heat reduces the accuracy of the amount of irradiation position shift and the amount of focus shift has been mentioned above.

FIG. 9B is a diagram showing a shielding member 72. If there is nothing on a straight line connecting the pupil splitting member 87 and the deflector 84, hot air will hit the pupil splitting member 87 directly. Similarly, if there is nothing on a straight line connecting the light detection element 88 and the deflector 84, hot air will hit the light detection element 88 directly. Therefore, hot air directly hitting the pupil splitting member 87 and the light detection element 88 can be suppressed by disposing the shielding member 72 on these two straight lines. Note that the shape and size of the shielding member 72 have to be large enough to be able to anticipate a sufficient hot air prevention effect, and can be determined through testing and simulation.

FIG. 9C is a diagram showing disposition of the pupil splitting member 87 and the light detection element 88 that enables the optical lenses 86 and 85 to be utilized as shielding members. In this way, hot air can be suppressed from directly hitting the pupil splitting member 87 and the light detection element 88, since the optical lenses 86 and 85 are located on a straight line connecting the pupil splitting member 87 and the deflector 84 and on a straight line connecting the light detection element 88 and the deflector 84.

In this way, providing a shielding member relative to the pupil splitting member 87 and the light detection element 88 enables the relative positional relationship of the pupil splitting member 87 and the light detection element 88 to be suppressed from deteriorating significantly. As a result, the amount of irradiation position shift and the amount of focus shift can be accurately computed.

Figure 10:
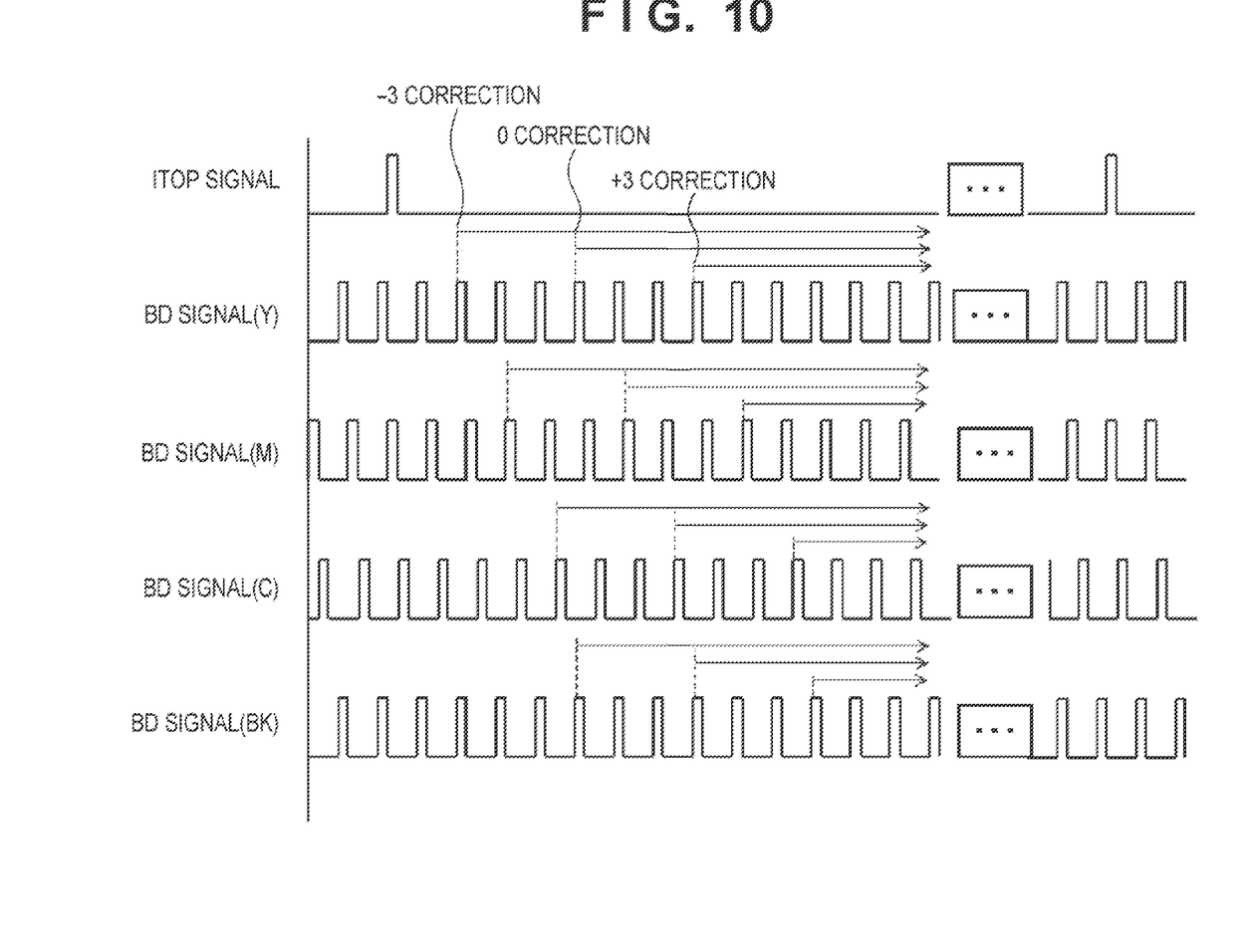
FIG. 10 is a diagram showing a method of correcting image position in a sub-scanning direction (rotation direction of photosensitive drum).

FIG. 10 is a diagram showing a method of correcting the image position in the sub-scanning direction (rotation direction of photosensitive drum). When forming an image, the print controller generates an ITOP signal and transmits the generated ITOP signal to the CPU 101 of an engine controller. The CPU 101 starts image formation at the timing at which a predetermined time has passed after receiving the ITOP signal. With the image forming apparatus 1 that forms multicolor images, the yellow imaging engine 10Y positioned furthest on the upstream side of the intermediate transfer belt 20 starts image forming first, as shown in FIG. 10. The imaging engines 10M, 10C and 10Bk of the other colors start image forming after delaying the image formation timing by a time corresponding to the distance from the imaging engine 10Y.

With an image forming apparatus that starts conveyance of sheets after image formation has started, the ITOP signal is generated at an arbitrary timing. Sheets are conveyed from the sheet feeding cassette 2 based on the ITOP signal. On the other hand, with an image forming apparatus that starts image formation after conveyance of sheets has started, sheets are detected by a sensor provided on the conveyance path, and the output signal of this sensor serves as the ITOP signal.

In FIG. 10, 0 correction indicates the image write timing in the case where correction is not performed. Correction of the image position in the sub-scanning direction is executed by shifting the write timing. In view of this, the CPU 101 changes the count number of BD signals from the ITOP signal in accordance with the correction value. The case of performing −3 step correction and the case of performing +3 step correction are illustrated using FIG. 10. The CPU 101, by correcting the count number with a correction value that depends on the amount of image forming position shift, is able to correct the image position in the sub-scanning direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104737 filed May 9, 2011, which is hereby incorporated by reference herein in its entirety.

What is claimed is:

1. An optical scanning apparatus comprising:
a light source that outputs a light beam;
an optical member though which the light beam passes;

a deflector that deflects the light beam such that the light beam that has passed through the optical member moves on a photosensitive member in a predetermined direction;

a first light splitting unit that splits the light beam from the deflector into a plurality of light beams in the movement direction of the light beam on the photosensitive member;

a second light splitting unit that splits the light beam from the deflector into a plurality of light beams in a direction orthogonal to the movement direction;

a detection unit that detects the plurality of light beams split by the first light splitting unit and the plurality of light beams split by the second light splitting unit;

a shift amount determination unit that determines, from image forming positions on the detection unit of the plurality of light beams split by the first light splitting unit, an amount of focus shift which is an amount of shift relative to a target diameter of a spot diameter of the light beams in the movement direction and an amount of image forming position shift which is an amount of shift relative to a target position of the image forming positions of the light beams in the movement direction, and determines, from the image forming positions on the detection unit of the plurality of light beams split by the second light splitting unit, the amount of focus shift and the amount of image forming position shift in the direction orthogonal to the movement direction; and a movement unit that moves the optical member in an optical axis direction of the light beam by an amount of movement corresponding to the amount of focus shift in the movement direction and the amount of focus shift in the direction orthogonal to the movement direction.

2. The optical scanning apparatus according to claim 1, further comprising:

an adjustment unit that adjusts a write start timing of the light beam from the light source in the movement direction by a first adjustment amount corresponding to an amount of image forming position shift in the movement direction derived as the amount of shift relative to a first target position of the image forming positions of the plurality of light beams split by the first light splitting unit, and adjusts a write start timing of the light beam from the light source in the direction orthogonal to the movement direction by a second adjustment amount corresponding to an amount of image forming position shift in the direction orthogonal to the movement direction derived as the amount of shift relative to a second target position of the image forming positions of the plurality of light beams split by the second light splitting unit.

3. The optical scanning apparatus according to claim 1, wherein a shielding member for shielding hot air from the deflector is disposed on at least one of a straight line connecting the deflector and the detection unit, a straight line connecting the deflector and the first light splitting unit, and a straight line connecting the deflector and the second light splitting unit.

4. The optical scanning apparatus according to claim 1, further comprising:

an image forming position distance computation unit that computes a distance between the image forming position of a first light beam and the image forming position of a second light beam among the plurality of light beams split by the first light splitting unit;

a difference computation unit that computes a difference between the computed distance and a predetermined target distance; and a first movement amount determination unit that determines an amount of movement corresponding to the difference between the computed distance and the predetermined target distance, using a function or a table.

5. The optical scanning apparatus according to claim 1, further comprising:

an image forming position distance computation unit that computes a distance between the image forming position of a first light beam and the image forming position of a second light beam among the plurality of light beams split by the second light splitting unit;

a difference computation unit that computes a difference between the computed distance and a predetermined target distance; and a movement amount determination unit that determines an amount of movement corresponding to the difference between the computed distance and the predetermined target distance, using a function or a table.

6. The optical scanning apparatus according to claim further comprising:

a midpoint computation unit that computes a midpoint between the image forming position of a first light beam and the image forming position of a second light beam among the plurality of light beams split by the first light splitting unit;

a midpoint distance computation unit that computes a distance between the midpoint computed by the midpoint computation unit and a predetermined target point; and an adjustment amount determination unit that determines an amount of adjustment corresponding to the distance between the midpoint and the predetermined target point computed by the midpoint distance computation unit, using a function or a table.

7. The optical scanning apparatus according to claim further comprising:

a midpoint computation unit that computes a midpoint between the image forming position of a first light beam and the image forming position of a second light beam among the plurality of light beams split by the second light splitting unit;

a midpoint distance computation unit that computes a distance between the midpoint computed by the midpoint computation unit and a predetermined target point; and an adjustment amount determination unit that determines an amount of adjustment corresponding to the distance between the midpoint and the predetermined target point computed by the midpoint distance computation unit, using a function or a table.

8. The optical scanning apparatus according to claim 1, wherein the first light splitting unit, the second light splitting unit and the detection unit are unified.

* * * * *